July 3, 1962 L. C. JONES 3,042,743
COIL FOR ELECTRICAL ROTATING MACHINE
Filed March 9, 1960 2 Sheets-Sheet 1

INVENTOR.
LOREN C. JONES
BY George H. Fritzinger
AGENT

United States Patent Office 3,042,743
Patented July 3, 1962

3,042,743
COIL FOR ELECTRICAL ROTATING MACHINE
Loren C. Jones, Columbus, Ohio, assignor to McGraw-Edison Company, Elgin, Ill., a corporation of Delaware
Filed Mar. 9, 1960, Ser. No. 15,251
8 Claims. (Cl. 174—120)

This invention relates to insulated electrical conductors and more particularly to conductors that are insulated by wrappings of mica material impregnated with synthetic resinous impregnants.

This application is a continuation-in-part of my co-pending application Serial No. 754,899 filed August 13, 1958, now abandoned, which in turn is a continuation-in-part of my co-pending application Serial No. 695,079 filed November 7, 1957, now abandoned, which is a division of my application Serial No. 642,752 filed February 27, 1957, now abandoned.

In the production of electrical apparatus, such as high voltage generators and the like, it has been the practice in the art to insulate the conductors of coils for such apparatus with wrappings of mica tape, composed of backing material between which are sandwiched mica flakes or mica paper united with a resinous binder. The wrapped conductors are subjected to an impregnating cycle wherein an asphaltic compound or more recently a completely reactive liquid polymerizable composition is forced into the interstices of the mica flakes and backing material of the tape.

It has been the practice in the art to utilize a high melting point asphaltic composition as the binder for the mica tape and, more recently, a resinous binder has been employed which may comprise liquid resinous polymers alone or polymers rendered liquid by the addition of plasticizers or solvents. In still other instances volatile adhesive mediums in the form of organic solvents have been used as binders for mica tape.

A difficulty is encountered when asphaltic compositions are employed as binders for mica tape in that such binders have been found to inhibit polymerization of subsequently applied impregnating resins so that such impregnating resins do not polymerize or cure adequately if used therewith.

Resinous binders present a problem in that they are never completely compatible with subsequently applied polymerizable impregnating resins, even in instances where the same composition is employed, with the resulting disadvantage that an interface exists between the impregnant and the binder in the interstices of the wrappings. Surface phases or interfaces between the binder and impregnant resins are undesirable since they result in nonuniform distribution of electrical stresses and mechanical weaknesses in the insulation. This lack of compatibility between similar or even identical polymerizable resinous binders and impregnants is believed to be due to changes that the compositions undergo during the lapse of time that is necessarily present between the application of the binder to the tape and the impregnation of the wrapped conductor.

Volatile adhesive mediums, in the form of organic solvents, have been found to be disadvantageous from the standpoint of producing a void-free bridge between a subsequently applied impregnant and the surfaces in the interstices since such organic solvents are not always completely removable from the interstices and may leave deposits therein that are deleterious to the materials and prevent the achievement of a void-free bridge between the impregnant and the surfaces in the interstices. Moreover, such volatile organic solvents present a serious disadvantage in that they are a fire and explosive hazard, produce noxious fumes, and are also a frequent cause of dermatitis when employed under production conditions.

It should be emphasized that when volatile organic solvents are used the components of the tape must be completely saturated if such solvents are to be effective as an adhesive medium. Hence the danger involved in using tapes of that type is readily apparent.

In general, the present invention completely eliminates the above mentioned difficulties by providing an improved mica tape insulation that is completely and efficiently impregnated with a suitable completely reactive liquid polymerizable composition so as to be void-free whereby superior electrical and structural properties are achieved.

It should be understood that tape material as mentioned in the present specification, shall include relatively wide sheet material sometimes used to wrap the straight slot portion of a coil. Such sheet material is commonly referred to as cell wrapper material.

In fabricating the insulation of the present invention the use of a permanent binder for the mica tape is eliminated and, instead, a temporary or fugitive binder is used in the mica tape during the fabrication thereof and again in applying the tape to the conductor.

According to the present invention it has been discovered that when water is utilized as a fugitive binder to maintain the mica material and backing material of the tape in assembled relationship during manufacture, and during application of the tape to the conductor, the water can be completely removed from the interstices of the mica material and backing material and the insulation subsequently impregnated with a completely reactive liquid polymerizable composition or other suitable impregnant.

It has also been discovered that an even more efficient fugitive binder for use in forming the tape can be formulated by a solution of a surface treating material in a volatile liquid compatible with the particular surface treating material. When such surface treating fugitive binders are employed, the highly volatile liquid portion of the solution can be substantially removed from the interstices of the insulation, but the surface treating material will remain and form a film on the surfaces within the interstices of the mica material and backing. Such film contains a reactive organic group that not only can combine with the subsequently applied completely reactive polymerizable impregnating composition but also improves the wetting ability of the impregnant. Hence when such surface treating fugitive binders are employed an extremely strong bonding bridge is obtained between the impregnating composition and the surfaces within the interstices of the mica tape. Moreover, the interstices are completely filled with the impregnating composition whereby the insulation is free of voids which if present would be detrimental to the electrical and structural characteristics of the insulation.

It is therefore an object of the present invention to provide an improved insulated electrical conductor having a wrapped mica tape insulation the interstices of which are completely and efficiently impregnated with a polymerized composition that forms a void-free bridge with the surfaces within the interstices whereby superior electrical and structural properties are achieved.

It is another object of the present invention to provide an improved insulated electrical conductor having a wrapped mica tape insulation the interstices of which include a polymerized resinous impregnant and a surface treating material that is highly compatible with the impregnant.

Further objects and advantages of the present invention will be apparent from the following description, reference being had to the accompanying drawings wherein preferred forms of embodiments of the invention are clearly shown.

Figure 1:
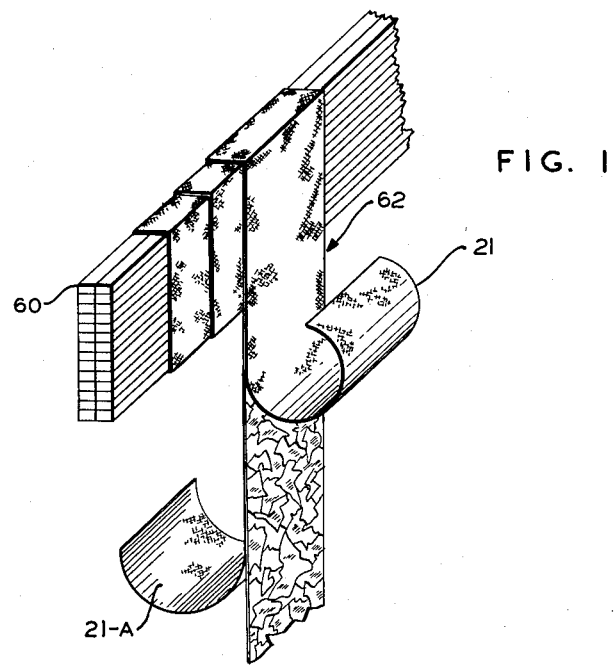
FIG. 1 is a perspective view of a typical composite electrical conductor showing the application of mica tape fabricated in accordance with the present invention.

Referring in detail to the drawings, a backing material 21 is preferably formed of woven cloth such as glass or cotton cloth but other suitable materials may be employed without departing from the spirit of the present invention. Various processes for fabricating composite insulation materials for insulating the novel electrical conductor of the present invention are illustrated and described in detail in my co-pending application Serial No. 754,898, filed August 13, 1958 since refiled on May 20, 1960, as a continuation-in-part application Serial No. 32,503.

The strip 21 of backing material is passed under a roller whereby the strip is immersed in a bath wherein the strip is wetted. The bath applies a fugitive binder to the strip and may consist of water, or a surface treating material in solution with water, or a surface treating material in solution with a suitable volatile liquid compatible with the particular surface treating material as will later be described in detail herein.

As an optional step in the process, prior to entering the bath the strip 21 of backing material may be passed through an oven wherein the strip 21 is heated for the purpose of drying off moisture or burning off sizing material in the backing, or to accomplish both these purposes if required. This optional step is particularly desirable where certain surface treating materials are employed in the bath as will later be described.

After leaving the bath a layer of mica flakes or mica paper is superimposed on the upper surface of strip 21 of backing material. The superimposed layer is treated with a fugitive binder of the same composition applied to strip 21.

A second strip 21-A of backing material, either of the same or different type from which strip 21 is formed, is passed under a roller whereby the strip is immersed in a bath wherein the strip is wetted with a fugitive binder of the same composition applied to the strip 21, and may then be applied to the upper surface of the layer of mica flakes or mica paper.

After assembling in the above manner, the composite tape is passed through a hot air circulating oven for the purpose of accelerating the drying off of the fugitive binder. This drying step is an important step in the application of some surface treating materials. For example, when methacrylato chromic chloride is utilized as a surface treating material for the components of the tape, the wetted materials should be dried in a hot air circulating oven to set the chromium complex to the tape materials. It is only necessary to dry off the composite tape materials and excessive heat should be avoided. For a typical glass fabric the temperature should not be in excess of 325 degrees Fahrenheit. After drying in a hot air circulating oven, the backing material may be washed well with continuously changing water, in order to remove any contaminants and the excess surface treating material, and for that purpose the composite tape may be next passed through a washing water bath.

In instances where the composite tape has been surface treated, and hence has been passed through a hot air circulating oven and a washing water bath, and further, where it is desired to store the tape in a dry condition, the tape is dried by passing same through a second hot air circulating oven after which it is wound up on storage roll for dry storage.

In other instances where the composite tape has been surface treated, and hence passed through a hot air circulating oven and a washing water bath, but where it is desired to immediately use the tape in a wetted condition, or to store tape in a non-drying environment, the second hot air circulating oven is dispensed with and the tape is passed directly from the washing water bath to storage roll for wet storage. It will be understood that the second oven may be used to remove a portion of moisture from the composite mica tape for better handling.

The previously mentioned fugitive binder baths may be provided by either water alone, or by a surface treating material in solution with water, or by a surface treating material in solution with a volatile liquid compatible with the particular surface treating material. Such fugitive binders serve to maintain the components of the tape together during assembly and as they progress through the various stages of the process. It has been found greatly advantageous to apply a surface treating material to both the mica and backing material of the composite tape at the various temporary binder baths. Such surface treating material serves its advantageous function by preparing the composite tape for more complete and efficient subsequent impregnation after the tape has been wrapped around an electrical conductor.

The surface treating bath, which also acts as a fugitive binder, may be prepared by diluting 100 parts of methacrylato chromic chloride with 4,680 parts of water. To this diluted solution is added, with good agitation, 222 parts of aqueous ammonia (1% $NH_3$), at such a rate that no permanent precipitation occurs. All parts are by weight. The pH of this solution, immediately after preparation, should be in the range of 5–6.5. As previously stated, the backing material may be first heat cleaned or dried by passing same through an oven and to complete the surface treatment of the mica material and backing material the composite tape may be dried in a hot air circulating oven and washed in a washing water bath.

Another effective surface treating fugitive binder bath may be provided by a solution of a vinyl cilane and xylol. For example, vinyl chloro silane may be applied, in the liquid phase, from a solution in mineral spirits, carbon tetrachloride, or other organic solvents, For example, a 2.0% solution in xylol has been found to be satisfactory. After subjecting the components of the mica tape to a fugitive binder bath of a vinyl silane and xylol, the composite tape should be dried at between 50 and 70 degrees centigrade in an oven and the tape should then be washed in a water washing bath and either subsequently dried in an oven at between 50 and 70 degrees centigrade, or rolled up wet for storage.

As an alternative method of surface treating the mica and backing material a vinyl silane can be applied in the vapor phase, in which case it is not necessary to incorporate any surface treating material in the fugitive binder used in assembling the tape. Such vapor phase application involves the following steps: (1) Producing the vapor (boiling point 94 degrees centigrade) from a heated kettle. (2) Transferring the vapor to the treating chamber, the vapor must be kept at an elevated temperature to prevent condensation. (3) Sizing by bringing the vapor into contact with the material. Sufficient vapor must be available to insure thorough application. (4) Washing the material on emergence from the treating chamber. (5) Drying at 50 to 70 degrees centigrade or rolling up wet for storage.

When one of the above described surface treating materials is employed in fugitive binder baths, a film is formed on the surfaces of the interstices formed by the mica and backing material which film contains a reactive organic group that not only can combine with the polymerizable liquid resinous composition subsequently applied to the mica tape during the impregnation cycle, but also enhances the wetting ability of the impregnant.

Reference is next made to FIG. 1 which illustrates a typical composite mica tape, formed according to the present invention, being applied to a typical composite electrical conductor 60. The mica tape is indicated generally at 62 and consists of strips 21 and 21-A of backing material and an intermediate layer of mica material. Mica tape 62 is wrapped around electrical conductor 60 in a wetted condition, the fugitive binder used here being plain water.

Figure 2:
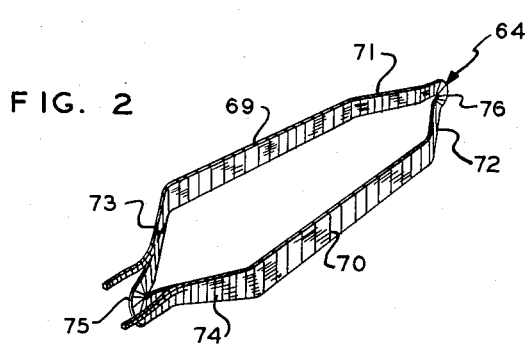
FIG. 2 is a perspective view of a typical coil to which the insulation of the present invention has been applied.

After a composite conductor has been shaped and taped, as illustrated by the coil indicated generally at 64 in FIG. 2, the insulated coil 64 is baked in a hot circulating oven to remove a major portion of the fugitive binder and then is suspended in a vacuum and pressure impregnating tank of a type well known to the art.

A typical vacuum impregnating cycle for impregnating mica taped coils, such as coil 64 of FIG. 2, is as follows:

(1) Pre-bake the coils 4 hours at 250 deg. F. to remove a large percentage of the temporary binder.

(2) Place coils in an impregnating tank and apply vacuum of one millimeter of mercury for 16 hrs. by exhausting air from the tank. The tank is maintained at 100 deg. F. during vacuum drying cycle.

(3) The tank is cooled to 55 deg. F. by circulating refrigerant through the tank and the impregnant which is maintained at 55 deg. F. is transferred into the tank at a pressure slightly above the vapor pressure of the impregnant. Vacuum is maintained for one hour.

(4) Vacuum is broken by admitting a dry inert gas, such as nitrogen, to the tank until a pressure of 80 lbs./sq. inch is reached. Pressure is held for ½ hour.

(5) Pressure is slowly reduced, by releasing gas from the tank, to slightly above the atmospheric pressure and held for ½ hour (approximately 5 pounds per square inch above atmospheric pressure).

(6) Impregnant is next withdrawn from the tank. After excess resin has drained from coils, the coils are removed from the tank.

After a coil 64 has been removed from the impregnating tank, subsequent to the above described impregnating cycle, the coil is next placed in a jig, during the curing of the impregnant. It is desirable to apply an outer wrapping of a material relatively impervious to the impregnant. A material known to the trade as Mylar (polyethylene terephthalate) is suitable for such outer wrapping. The purpose of the jig is to hold the coil and insulation in the proper shape while the impregnant is being cured. As seen in FIG. 2, coil 64 includes slot portions 69 and 70 which are subsequently placed in slots when the coil is wound in an electrical rotating machine. Coil 64 further includes end turns 71, 72, 73, and 74 and coil knuckles 75 and 76.

Completely reactive compositions suitable for use as impregnating compositions for the process may, for example, include any fluid polymerizable composition, ordinarily with a catalyst, that, upon being heated to a predetermined temperature, polymerizes into a thermosetting material. Specific examples of such compositions are disclosed and discussed in detail later herein.

Figure 3:
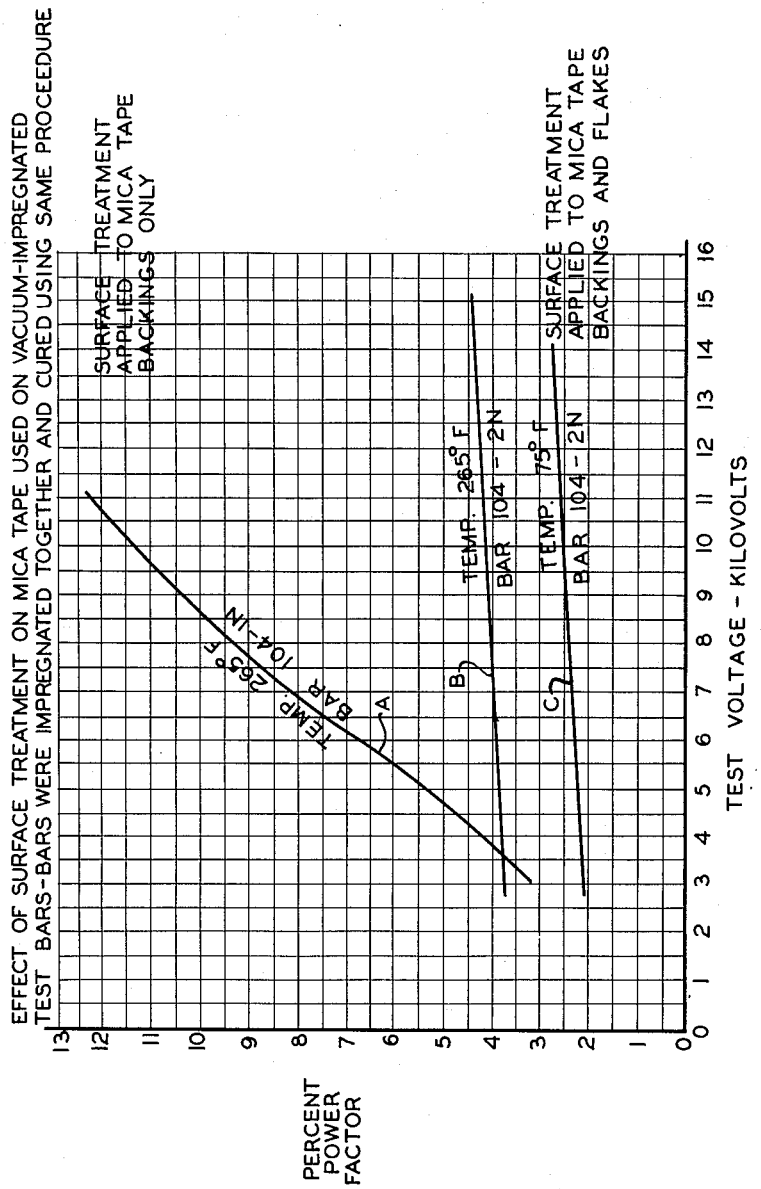
FIG. 3 is a graphical illustration showing the improved electrical characteristics achieved by the present invention.

Reference is next made to FIG. 3 which graphically illustrates, in a typical case, the outstanding improvement in electrical characteristics achieved when a surface treating material is utilized in the fugitive binder baths of the processes of the present invention. Referring first to lines A and B, two identical electrical conductor bars 104-1N and 104-2N were prepared in an identical manner and impregnated together and cured using the same procedure. The tapes used for wrapping the conductors each consisted of two strips of glass fiber backing material and intermediate layers of mica flakes. The impregnant used was a typical polymerizable resinous composition. The only difference in treatment was that in the case of bar 104-1N the surface treatment was applied only to the glass fiber backing material, whereas in the case of bar 104-2N the surface treatment was applied to both the backing material and the mica flakes, according to the present invention, whereby all the surfaces of all the interstices of the wrapped insulation were surface treated. In both instances the surface treating solution employed consisted of the solution of methacrylato chromic chloride prepared and applied as previously described herein. As is represented by line A of the graph, FIG. 3, bar 104-1N displayed a sharp rise in percent power factor with increases in the test voltage applied whereas bar 104-2N displayed only a negligible rise in percent power factor with increases in the test voltage applied as is represented by line B in the graph of FIG. 3.

Referring next to lines B and C, a comparison of power factors at room and elevated temperatures is illustrated. It will be noted that the slopes of lines B and C are the same indicating that the interstices of the mica material and backing material are completely filled with the impregnant.

When impregnated wrapped insulations are utilized it is a well established fact that at voltage stresses above the internal ionization level the more voids present in the insulation the higher will be the percent power factor and the greater will be the rate of increase of percent power factor with increases in applied voltage. Hence it will be understood why the void-free insulation produced by the surface treated mica tape of the present invention provides the outstanding low percent power factor characteristics represented by line B of the graph of FIG. 1.

It should also be emphasized that the main problem encountered in impregnating wrapping materials, of the type disclosed herein, results from the inherently poor wetting characteristics of the previously described impregnants which normally prevent these impregnants from completely wetting the individual yarn filaments of the backing material and minute interstices of the mica material. In accordance with the present invention it has been found that this problem is effectively overcome by using the previously described fugitive binder containing a surface treating material.

For the purpose of the present application the term "surface treating material" means an intermediate coupling agent that chemically bonds first to the backing material and mica material and subsequently to the resinous impregnant. Hence in accordance with the present invention the surface treating material makes possible the formation of a void-free bond between the subsequently applied resin and the mica material and backing material.

With reference to the methacrylato chloride example discussed above the "surface treating material" action is accomplished by the coordination of methacrylic acid with chromium to form a highly reactive complex which, when applied to the surface of micaceous material, the chromium complex is strongly attached. The reactive organic group which orients outwardly can subsequently combine with various polymerizable resins which are used as impregnants to fill the interstices between the mica and backing material.

It will therefore be understood that the "surface treating materials" used in the method of the present invention are materials which actually provide anchor points on micaceous material as well as anchor points on backing material to which a subsequently applied resinous impregnant will become chemically bonded. Hence the present invention provides a method for forming a tenacious bond between micaceous material, a resin impregnant, and a backing material.

For purposes of the present invention the term "surface treating materials" means compounds consisting of derivatives of silicate, amines, various organic derivatives of chromium, zirconium, aluminum, titanium, boron, and nickel which contain chemical functional groups capable of reacting not only with a suitable impregnating resin and the surfaces of glass cloth but also with surfaces of the micaceous material.

The term "surface treating material" also means one of the following compounds used alone or combined with one of the silanes:

Trimethylolphenylallyl ether
Butadiene-acrylic acid copolymer
Phenolic-polyvinyl butyral
Phenolic-Buna N
Polyvinyl acetate emulsion
Hydroabietyl maleate
Tolylene di-isocyanate
Polyvinyl butyral
Liquid polybutadiene It should be pointed out that the particular surface treating material to be selected will depend on the type of impregnating resin with which it is to be used. Moreover, a particular surface treating material can be formulated from the previously mentioned compounds so as to include an organic group that chemically bonds with the particular impregnating resin to be used.

Examples of specific surface treating compositions that have been found suitable for practicing the present invention and the corresponding resin types with which each reacts are as follows:

| Surface Treating Material | Suitable Resinous Impregnants |
|---|---|
| methacrylato chromic chloride | polyester and epoxy resins and modifications and combinations thereof. |
| vinyltrichlorosilane | polyester and modified polyester resins. |
| vinyltriethoxysilane | Do. |
| amino-functional silane | epoxy and modified epoxy resins. |

In general, if the impregnating resin contains a vinyl group, such as a polyester, then the surface treating material must contain a vinyl group which will react with the vinyl group in the impregnating resin. If, however, the organic impregnating resin contains polar groups such as epoxies, then the surface treating material must contain amine groups which will react with the polar groups of the impregnating resin.

It is believed that the bond between the surface treating material and the mica is due to the presence of hydroxyl groups on the surfaces of the mica which combine, through oxygen linkages, with the molecules of the surface treating material.

It is further believed that the free hydroxyl groups, present in the various surface treating materials provide additional oxygen linkages that freely combine with the surfaces of the micaceous material which augments the strength of the bond.

It is further believed that where there is a deficiency in hydroxyl groups the higher molecular weight surface treating molecule is strongly held by electrostatic forces.

A typical impregnating resin for use with the wrapping material of the present invention may be a polyester derived from the polycondensation products of dicarboxylic acids with dihydroxy alcohols when one or both of the materials is unsaturated. These compounds may be modified by monocarboxylic acids, monohydroxy alcohols, and even small amounts of polycarboxylic acids or polyhydroxy alcohols.

The polyester is subsequently dissolved in one or a combination of the following monomeric copolymerizable compounds:

Styrene (vinylbenzene)
Divinylbenzene
Alphamethylstyrene
Diallyl phthalate
Methyl methacrylate
Triallyl cyanurate
Vinyltoluene Suitable catalysts for the polyester resin are as follows:

Benzoyl peroxide
Cumene hydroperoxide
Tertiary-butyl perbenzoate

Another typical impregnating resin for use with wrapping material of the present invention may be an epoxy synthesized by reacting epichlorohydrin and bisphenol A in presence of excess caustic.

Suitable diluents for an epoxy are exemplified by one or more of the following:

Allyl glycidyl ether
1,4-butanedial deglycidyl ether
Butyl glycidyl ether
Cresyl glycidyl ether
Glycidyl methacrylate monomer
Octylene oxide
Phenyl glycidyl ether
Styrene oxide
Cardolite NC–513 proprietary (3M)

Suitable curing agents for the epoxy resin are as follows:

Diethylene triamine
Dimethylamino propylamine
Methylene dianiline
$BF_3$ monoethylamine
Hexahydrophthalic anhydride
Methylated maleic acid adduct of phthalic anhydride It will be understood that the foregoing resins may be further modified with suitable flexibilizers and plasticizers which are well known to those skilled in the art.

While the forms of embodiments of the present invention as herein disclosed constitute preferred forms, it is to be understood that other forms might be adopted, all coming within the scope of the claims which follow. In the interpretation of the claims it is to be understood that the term "resin" may include one or more of the usual flexiblizers, diluents, curing agents, catalysts and plasticizers.

I claim:

1. An insulated electrical conductor comprising a conductor portion and an insulating portion surrounding said conductor portion, said insulating portion comprising a composite wrapping formed of glass cloth backing material and mica material having interstices therein formed by surfaces of said backing material and surfaces of said mica material; a thin layer of a reactive surface treating material selected from the group consisting of methacrylato chromic chloride, vinyltrichlorsilane, vinyltriethoxysilane, amino-functional silane, on the surfaces of said mica material and backing material; and a polymerized thermosetting resin completely filling all of said interstices and in intimate bonded relationship with all of said surfaces of said backing material and mica material, said resin being selected from the group consisting of polyester resins, epoxy resins and combinations thereof.

2. An insulated electrical conductor comprising a conductor portion and an insulating portion surrounding said conductor portion, said insulating portion comprising a composite wrapping formed of backing material and mica material having interstices therein formed by surfaces of said backing material and surfaces of said mica material; a thin layer of a reactive organic chrome derivative on the surfaces of said mica material and backing material; and a polymerized thermosetting resin completely filling all of said interstices and in intimate bonded relationship with all of said surfaces of said backing material and mica material, said resin being selected from the group consisting of polyester resins, epoxy resins and combinations thereof.

3. An insulated electrical conductor comprising a conductor portion and an insulating portion surrounding said conductor portion, said insulating portion comprising a composite wrapping formed of backing material and mica material having interstices therein formed by surfaces of said backing material and surfaces of said mica material; a thin layer of a vinyl silane chemically bonded to the surfaces of said mica material and backing material; and a polymerized thermosetting resin chemically bonded to said vinyl silane and completely filling all of said interstices and in intimate bonded relationship with all of said surfaces of said backing material and mica material, said resin being selected from the group consisting of polyester resins, epoxy resins and combinations thereof.

4. An insulated electrical conductor comprising a conductor portion and an insulating portion surrounding said conductor portion, said insulating portion comprising a composite wrapping formed of glass cloth backing material and mica material having interstices therein formed by the surfaces of said backing material and said mica material; a thin layer of methacrylato chromic chloride chemically bonded to the surfaces of said mica material and backing material; and a polymerized thermosetting resin chemically bonded to said methacrylato chromic chloride and completely filling all of said interstices and in intimate bonded relationship with all of said surfaces of said backing material and mica material, said resin being selected from the group consisting of polyester resins, epoxy resins and combinations thereof.

5. An insulating pliable tape adapted to be wrapped around an electrical conductor and to be thereupon impregnated with a polymerizable thermosetting resin, comprising superimposed layers of fibrous insulating backing material and of mica material all free of resinous binder, and a thin film of a reactive surface treating material completely covering the surfaces of both said mica material and backing material, said film of surface treating material being chemically bonded to the surfaces of both said mica material and backing material and being capable of reacting with polyester and epoxy thermosetting resins to bond firmly said resins to the surfaces of said backing and mica materials.

6. The insulating tape set forth in claim 5 wherein said surface treating material is selected from the group consisting of methacrylatochromic chloride, vinyltrichlorosilane, vinyltriethoxysilane and an amino functional silane.

7. The insulating tape set forth in claim 5 wherein said backing material comprises a woven glass fabric and said surface treating material comprises methacrylatochromic chloride.

8. The insulating tape set forth in claim 5 wherein said backing material comprises a woven glass fabric and wherein said tape is impregnated with water to bond the glass fabric and mica layer together during wrapping.

References Cited in the file of this patent

UNITED STATES PATENTS

| | | |
|---|---|---|
| 2,456,251 | Boughton et al. | Dec. 14, 1948 |
| 2,470,357 | Hill | Aug. 16, 1949 |
| 2,479,417 | Schulman | Aug. 16, 1949 |
| 2,649,396 | Witt et al. | Aug. 18, 1953 |
| 2,656,290 | Berberich | Oct. 20, 1953 |
| 2,700,010 | Balz | Jan. 18, 1955 |
| 2,829,191 | Rogers | Apr. 1, 1958 |
| 2,953,466 | Brown | Sept. 20, 1960 |